(12) United States Patent
Davydov et al.

(10) Patent No.: US 9,467,269 B2
(45) Date of Patent: Oct. 11, 2016

(54) SYSTEMS AND METHODS FOR MODULATION AND CODING SCHEME SELECTION AND CONFIGURATION

(71) Applicant: Intel IP Corporation, Santa Clara, CA (US)

(72) Inventors: Alexei Davydov, Nizhny Novgorod (RU); Hwan-Joon Kwon, Santa Clara, CA (US); Seunghee Han, Cupertino, CA (US); Gregory V. Morozov, Nizhny Novgorod (RU)

(73) Assignee: INTEL IP CORPORATION, Santa Clara, CA (US)

( * ) Notice: Subject to any disclaimer, the term of this patent is extended or adjusted under 35 U.S.C. 154(b) by 59 days.

(21) Appl. No.: 14/496,970

(22) Filed: Sep. 25, 2014

(65) Prior Publication Data

US 2015/0195818 A1 Jul. 9, 2015

Related U.S. Application Data

(60) Provisional application No. 61/924,194, filed on Jan. 6, 2014, provisional application No. 61/943,973, filed on Feb. 24, 2014, provisional application No. 61/990,628, filed on May 8, 2014.

(51) Int. Cl.
*H04L 5/00* (2006.01)
*H04L 1/00* (2006.01)

(52) U.S. Cl.
CPC ........... *H04L 5/0057* (2013.01); *H04L 1/0016* (2013.01); *H04L 1/0026* (2013.01); *H04L 1/003* (2013.01); *H04L 1/009* (2013.01)

(58) Field of Classification Search
CPC .. H04W 72/04; H04L 5/0057; H04L 1/0016; H04L 1/009; H04L 1/003; H04L 1/0026
See application file for complete search history.

(56) References Cited

U.S. PATENT DOCUMENTS

| 2009/0109909 A1 | 4/2009 | Onggosanusi et al. |
| 2011/0205988 A1 | 8/2011 | Zhang et al. |

(Continued)

FOREIGN PATENT DOCUMENTS

| EP | 1901496 B1 | 9/2010 |
| WO | 2008111809 A2 | 9/2008 |

(Continued)

OTHER PUBLICATIONS

3GPP TS 36.212, "LTE; Evolved Universal Terrestrial Radio Access (E-UTRA); Multiplexing and channel coding (Release 11)", V11.3.0, Jul. 2013, 86 pages.

(Continued)

*Primary Examiner* — Jianye Wu
(74) *Attorney, Agent, or Firm* — Stoel Rives LLP

(57) ABSTRACT

Methods, systems, and devices for modulation and coding scheme selection and configuration. A mobile communication device includes a table component, a table selection component, and a communication component. The table component is configured to maintain two or more tables each having entries for a plurality of available modulation schemes. The two or more tables include a default table and a secondary table. The default table and the secondary table have a matching number of entries, and the secondary table includes an entry corresponding to a 256-QAM scheme. The table selection component is configured to select a selected table from one of the default table and the secondary table. The communication component is configured to receive and process a communication from a base station based on a modulation and coding scheme of the selected table.

9 Claims, 6 Drawing Sheets

(56) References Cited

U.S. PATENT DOCUMENTS

| | | | |
|---|---|---|---|
| 2013/0003663 A1 | 1/2013 | Blankenship et al. | |
| 2013/0188473 A1 | 7/2013 | Dinan | |
| 2013/0301542 A1* | 11/2013 | Krishnamurthy | H04W 52/50 370/329 |
| 2013/0308723 A1 | 11/2013 | Miyata | |
| 2014/0045497 A1* | 2/2014 | Abe | H04L 1/0067 455/435.1 |
| 2015/0036590 A1 | 2/2015 | Lahetkangas et al. | |
| 2015/0163773 A1 | 6/2015 | Wang et al. | |

FOREIGN PATENT DOCUMENTS

| | | |
|---|---|---|
| WO | 2009055401 A1 | 4/2009 |
| WO | 2013123961 | 8/2013 |
| WO | 2013124266 A1 | 8/2013 |
| WO | 2013173023 A1 | 11/2013 |

OTHER PUBLICATIONS

3GPP TS 36.213, "LTE; Evolved Universal Terrestrial Radio Access (E-UTRA); Physical layer procedures (Release 10)", V10.10.0, Jul. 2013, 129 pages.

3GPP TS 36.306, "LTE; Evolved Universal Terrestrial Radio Access (E-UTRA); User Equipment (UE) radio access capabilities (Release 11)", V11.4.0, Sep. 2013, 29 pages.

3GPP TS 36.331, "LTE; Evolved Universal Terrestrial Radio Access (E-UTRA); Radio Resource Control (RRC); Protocol specification (Release 11)", V11.5.0, Sep. 2013, 351 pages.

Ericsson, "On standard impacts to support 256QAM in downlink", R1-135655, 3GPP TSG RAN WG1 Meeting #75, San Francisco, United States, Nov. 11-15, 2013, 3 pages.

HTC, "On Small Cell Enhancement for Improved Spectral Efficiency", R1-130311, 3GPP TSG RAN WG1 Meeting #72, St Julian's, Malta, Jan. 28-Feb. 1, 2013, 4 pages.

PCT/US2015/010271, International Search Report and Written Opinion, Apr. 28, 2015, 15 pages.

Qualcomm, "New UE categories", RP-131162, 3GPP TSG-RAN meeting #61, Porto, Portugal, Sep. 3-6, 2013, 3 pages.

Samsung, "Discussion on specification impacts of 256QAM", R1-135208, 3GPP TSG RAN WG1 Meeting #75, San Francisco, United States, Nov. 11-15, 2013, 3 pages.

3GPP TS 36.213, "Evolved Universal Terrestrial Radio Access (E-UTRA); Physical layer procedures (Release 11)", V11.4.0, Oct. 2013, 184 pages.

\* cited by examiner

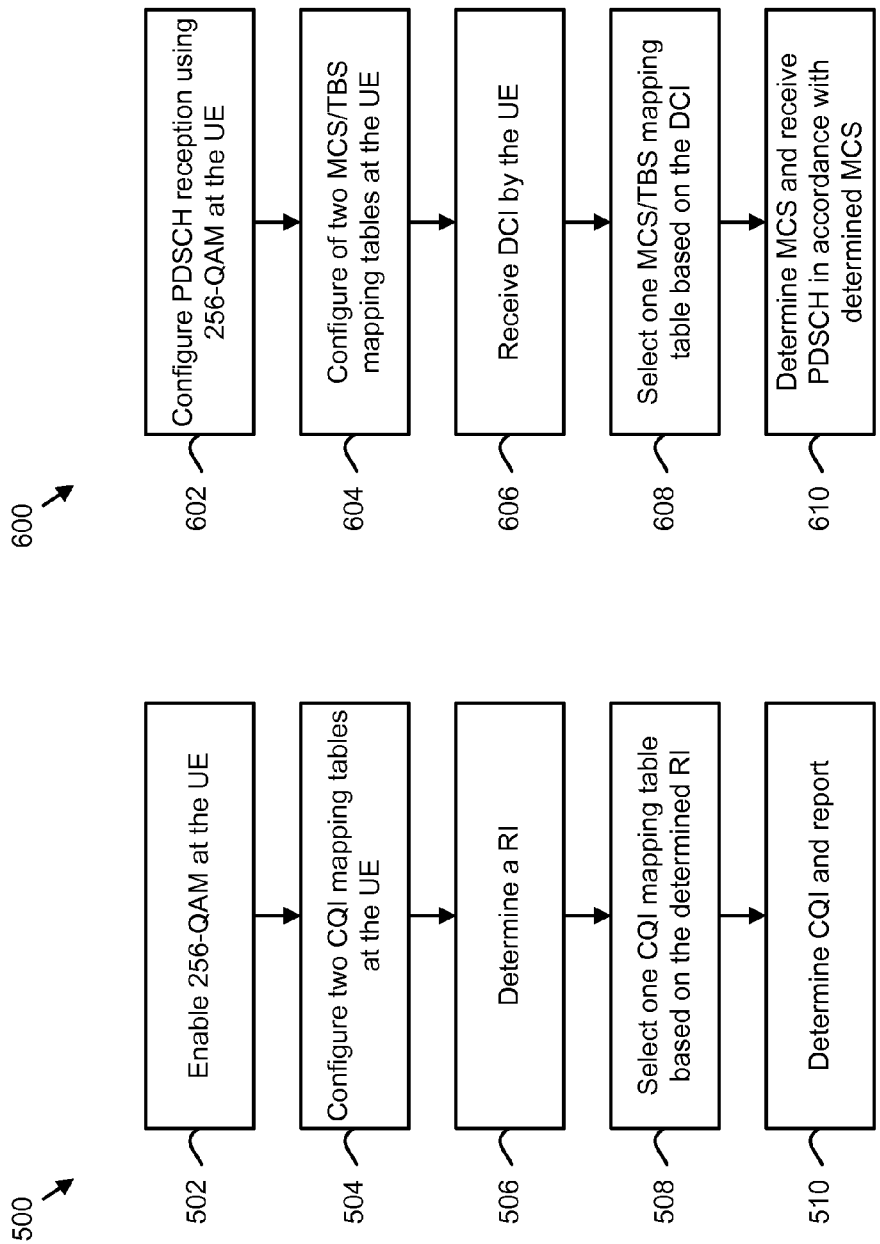

SYSTEMS AND METHODS FOR MODULATION AND CODING SCHEME SELECTION AND CONFIGURATION

RELATED APPLICATIONS

This application claims the benefit under 35 U.S.C. §119(e) of U.S. Provisional Application No. 61/924,194, filed on Jan. 6, 2014 which is hereby incorporated by reference its entirety. This application also claims the benefit under 35 U.S.C. §119(e) of U.S. Provisional Application No. 61/943,973, filed on Feb. 24, 2014, and U.S. Provisional Application No. 61/990,628, filed on May 8, 2014.

TECHNICAL FIELD

The present disclosure relates to selecting and configuring a modulation and coding scheme for communication on a mobile network.

BRIEF DESCRIPTION OF THE DRAWINGS

FIG. 5 is schematic flow chart diagram illustrating a method for determining and reporting a channel quality indicator.

FIG. 6 is schematic flow chart diagram illustrating a method for determining and reporting a modulation and coding scheme for wireless communication.

DETAILED DESCRIPTION OF PREFERRED EMBODIMENTS

Figure 1:
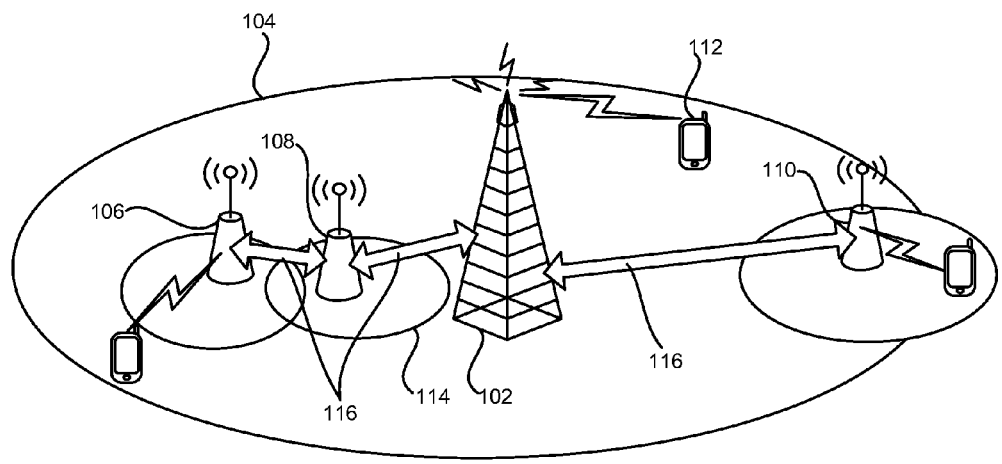
FIG. 1 is a schematic diagram illustrating an example system for wireless communication.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a node (e.g., a transmission station or a transceiver node) and a wireless device (e.g., a mobile communication device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) Rel. 8, 9 and 10, the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11-2012 standard, which is commonly known to industry groups as WiFi.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission may be a communication from the node (e.g., eNB) to the wireless device (e.g., UE), and the uplink (UL) transmission may be a communication from the wireless device to the node.

In homogeneous networks, the node, also called a macro node or macro cell, may provide basic wireless coverage to wireless devices in a cell. The cell may be the area in which the wireless devices are operable to communicate with the macro node. Heterogeneous networks (HetNets) may be used to handle the increased traffic loads on the macro nodes due to increased usage and functionality of wireless devices. HetNets may include a layer of planned high power macro nodes (macro-eNBs or macro cells) overlaid with layers of lower power nodes (small cells, small-eNBs, micro-eNBs, pico-eNBs, femto-eNBs, or home eNBs [HeNBs]) that may be deployed in a less well planned or even entirely uncoordinated manner within the coverage area (cell) of a macro node. The lower power nodes may generally be referred to as "small cells," small nodes, or low power nodes.

In addition to increasing coverage and/or load capacity, the proximity to a node and favorable geometry experienced by UEs in some small cell deployments provides the possibility for using higher order modulation schemes for the downlink transmission. For example, current modulation schemes in 3GPP peak at 64 quadrature amplitude modulation (QAM) while the improved proximity and geometry may allow for 256-QAM. However, support of the additional modulation scheme may, in some proposals, include changes in the downlink control signaling formats for indicating a modulation and coding scheme (MCS) with 256-QAM as well as a modification in uplink control information (UCI) signaling formats for reporting a channel quality indicator (CQI) for a link quality corresponding to 256-QAM. In some cases straightforward extension of the existing signaling by adding additional bits in the corresponding fields of the downlink and uplink control information is not desirable, due to additional signaling overhead and potential negative impact on the uplink coverage for some of the uplink control messages (e.g., Physical Uplink Control Channel [PUCCH]).

Currently, in accordance with the LTE specification (see 3GPP Technical Specification [TS] 36.213 V11.4.0 [2013-10]) the modulation is derived at the UE based on a 5-bit field provided by a serving cell in DCI per each transport block using an MCS index parameter ($I_{MCS}$). The UE uses the value $I_{MCS}$ received in the DCI in conjunction with a table coded into the specification (specifically Table 7.1.7.1-1 of 3GPP TS 36.213) to determine the modulation order ($Q_m$) and transport block size (TBS) used in the physical downlink shared channel (PDSCH).

The channel quality indicator (CQI) contains information sent from a UE to the eNB (i.e., in the UL) to indicate the most suitable MCS value for the downlink transmissions. The CQI is a 4-bit value and is based on the observed signal-to-interference-plus-noise ratio (SINR) at the UE on each codeword. The CQI estimation takes into account the UE capability such as the number of antennas and the type of receiver used for detection. The CQI values are used by the eNB for MCS selection (link adaptation) for the downlink transmission. The CQI definition and interpretations of CQI indices are given in Table 7.2.3-1 of 3GPP TS 36.213. Based on an unrestricted observation interval in time and frequency, the UE derives, for each CQI value reported in uplink subframe n, the highest CQI index between 1 and 15 in Table 7.2.3-1 which satisfies a channel quality condition, or CQI index 0 if CQI index 1 does not satisfy the condition. Specifically, the channel quality condition is that a single PDSCH transport block with a combination of modulation scheme and transport block size corresponding to the CQI index, and occupying a group of downlink physical resource blocks termed the CSI reference resource, could be received with a transport block error probability not exceeding 0.1.

Based on the foregoing, and in light of the present disclosure, it can be seen that straightforward extension of the existing MCS and CQI tables with additional entries corresponding to 256-QAM would require an additional bit for each of the $I_{MCS}$ and CQI parameters. However, this change would necessitate changes in the downlink and uplink control signaling formats. In the present disclosure, we propose various methods for configuring 256-QAM signaling in the downlink and uplink control channels without requiring changes to the uplink and downlink control signaling formats. In one embodiment, the sizes of the tables used for indicating $I_{MCS}$ and CQI are maintained so that there is no need to define new DCI format and CQI reporting.

In one embodiment, a UE includes a table component, a table selection component, and a communication component. The table component is configured to maintain two or more tables each having entries for a plurality of available modulation schemes. The two or more tables include a default table and a secondary table. The default table and the secondary table have a matching number of entries, and the secondary table includes an entry corresponding to a 256-QAM scheme. The table selection component is configured to select a selected table from one of the default table and the secondary table. The communication component is configured to receive and process a communication from an eNB based on a modulation and coding scheme of the selected table. In some embodiments, the present disclosure allows a UE or an eNB to support an entire range of modulation schemes (from QPSK to 256-QAM) without any changes in the signaling format for downlink and uplink control channels (i.e., no new DCI and UCI formats).

As used herein, the terms "node" and "cell" are both intended to be synonymous and refer to a wireless transmission point operable to communicate with multiple user equipment, such as an eNB, a low power node, or other base station.

FIG. 1 is a schematic diagram illustrating nodes in a RAN. The RAN includes an eNB 102 that provides wireless communication services within a macro cell coverage area 104. Within the macro cell coverage area 104 are two small cells 106, 108 which may be used to improve capacity in high use areas by allowing the macro cell to offload to the small cells 106, 108. Another small cell 110 is illustrated as existing on the edge of the coverage area 104. The small cells 106, 108, and 110 provide coverage in small cell coverage areas 114 which may be used to fill coverage holes within the macro cell coverage area 104 and at the edge of the boundaries between the macro cell coverage area 104, as shown in FIG. 1. The eNB 102 and small cells provide communication services to one or more UEs 112. In one embodiment, the eNB 102 and small cells 106, 108, and 110 coordinates communications, handovers, and other communication services as indicated by arrows 116.

While three small cells 106, 108, 110 are illustrated within the macro cell coverage area 104 of the eNB 102, a macro cell's coverage area may include hundreds of small nodes. For example, small nodes configured as HeNBs may be located in hundreds of homes that are within the coverage area of a single macro node. Similarly, within one RAN there may be a mixture of sparse and dense small cell deployments. In one embodiment, one or more of the small cells 106, 108, 110 are deployed independently of a macro node. Similarly, one or more of the small cells may be positioned such that there is no overlap with the macro node's coverage area 104.

According to one embodiment, the eNB 102 or other controllers for the macro cell, small cells 106, 108, and 110 are configured to vary an MCS used to communicate with the UEs 112. For example, an MCS used to communicate with a specific UE 112 may vary based on a current channel quality. As discussed above, due to reduced distances and improved geometry, UEs 112 may be capable of communicating using higher order modulation schemes within small cells than within the macro cell. In one embodiment, the UE 112 and eNB 102 (or other RNC) maintain or configure alternate tables for selecting or indicating an MCS. For example, the eNB 102 may send a message to a UE 112 configuring a new table to be used in place of a legacy table. The new table may include an MCS that has a higher spectral efficiency than the legacy table. The UE 112 may determine which table to use for sending channel quality indicators and for interpreting an indication of which MCS to use to process received communications. More detailed operation and examples will be discussed in relation to the remaining figures.

Figure 2:
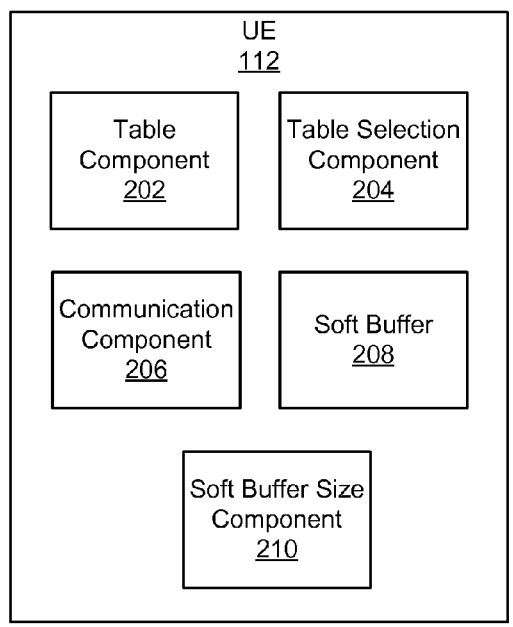
FIG. 2 is a schematic block diagram of example components of user equipment (UE).

FIG. 2 is a schematic block diagram of one embodiment of a UE 112. The UE 112 includes a table component 202, a table selection component 204, a communication component 206, a soft buffer 208, and a soft buffer size component 210. The components 202-210 are given by way of example only and may not all be included in all embodiments. Some embodiments may include any one or any combination of two or more of the components 202-210.

The table component 202 is configured to store or maintain a plurality of tables. In one embodiment, the table component 202 is configured to maintain tables for selection and indication of modulation schemes, coding rates, transport block size, or the like. In one embodiment, the table component 202 maintains two different tables that are used for the same purpose. For example, the table component 202 may store a default table and a secondary table, which can be used in place of the default table. The default table may correspond to a previous version of a communication standard or to modulation schemes that some UEs 112 that use a mobile network are capable of using. For example, multiple types and versions of UEs 112 may be used to access a mobile network, and different types and versions may have different peak data rates or modulation order capabilities. In one embodiment, in a given subframe on a given cell only one of the tables is used. For example, all PDSCH within a given subframe may be interpreted based on the same table.

Each table may include a plurality of entries for different modulation schemes which can be used by a UE 112 or an eNB 102. In one embodiment, the number of entries in each table matches so that the entries can be used in place of each other. In one embodiment, the number of entries in the secondary table is less than or equal to the number of entries in the default table. In one embodiment, the default table includes schemes that can be used by any attached UE 112 while the secondary table includes higher order modulations or schemes that only certain UEs 112 are capable of utilizing. In one embodiment, the secondary table includes a modulation scheme that has a higher order modulation than any of the schemes in the default table. For example, the maximum modulation order in the default table may be 64-QAM while the highest order modulation in the secondary table may be 256-QAM.

In one embodiment, the table component 202 stores or maintains a modulation and coding scheme index $I_{MCS}$ table. The $I_{MCS}$ table may include a table used to select a modulation order and transport block size (using $I_{TBS}$) based on an MCS index. One example of an $I_{MCS}$ table includes the Modulation and TBS index table for PDSCH (Table 7.1.7.1-1) defined in 3GPP TS 36.213, which is reproduced below.

TABLE 1

| MCS Index ($I_{MCS}$) | Modulation Order ($Q_m$) | TBS Index ($I_{TBS}$) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

In one embodiment, Table 1 is used as the default or legacy table while a new table is used as the enhanced or secondary table. Usage of Table 1 may provide backward compatibility with existing UEs 112 and UEs 112 that operate with current standards. In one embodiment, a secondary table is used to provide modulation schemes that can be used by new UEs 112 and subsequent releases. In one embodiment, the secondary table includes a 256-QAM modulation order (Qm=8). In one embodiment, the total number of entries in each of the default table and the secondary table does not exceed 32 to accommodate indication using $I_{MCS}$ in a 5-bit field.

In one embodiment, multiple secondary tables are specified or maintained. For example any one of the secondary tables may be a candidate for the secondary (or new) table. In one embodiment, a radio resource control (RRC) message from the serving cell indicates which table out of the multiple secondary tables should be used as the secondary table. In one embodiment, one of the secondary tables are defined as a default secondary table. The UE 112 may use the default secondary table as the secondary table unless a serving cell or eNB 102 indicates otherwise.

In one embodiment, the secondary table includes a table similar to Table 1 with one or more of the entries (e.g., rows) swapped out for a different configuration. In one embodiment, the default table includes a first entry corresponding to a first modulation order and a second entry corresponding to a second modulation order higher than the first modulation order and having the same spectral efficiency. In one embodiment, the secondary table includes a 256-QAM scheme in place of one of the first entry and the second entry. By way of example, rows corresponding to $I_{MCS}$ values 10 and 17 in Table 1 may be swapped out with 256-QAM modulation orders (Qm=8) in the secondary table. Values 10 and 17 may be of interest because they have a same spectral efficiency as $I_{MCS}$ values 9 and 16. Specifically, note that in Table 1 two entries with the same spectral efficiency are defined since one performs better than the other depending on frequency/time selectivity of the channel. For instance, $I_{MCS}$ values 9 and 10 have the same spectral efficiency and $I_{MCS}$ values 16 and 17 have the same spectral efficiency, but $I_{MCS}$=9 performs better than $I_{MCS}$=10 in a less frequency-selective channel while $I_{MCS}$=10 performs better than $I_{MCS}$=9 in a more frequency-selective channel. However, in one embodiment, the main target of the secondary table is to serve a UE 112 experiencing a less time/frequency-selective channel. In this embodiment, we can substitute entries for $I_{MCS}$ values 10 and 17 to make more entries available to 256-QAM entries while minimizing the performance impact of having less entries assigned to QPSK, 16-QAM, and 64-QAM. Table 2 illustrates one embodiment of a secondary $I_{MCS}$ table.

TABLE 2

| MCS Index ($I_{MCS}$) | Modulation Order ($Q_m$) | TBS Index ($I_{TBS}$) |
|---|---|---|
| 0 | 2 | 0 |
| 1 | 8 | 27 |
| 2 | 2 | 2 |
| 3 | 8 | 28 |
| 4 | 2 | 4 |
| 5 | 8 | 29 |
| 6 | 2 | 6 |
| 7 | 8 | 30 |
| 8 | 2 | 8 |
| 9 | 8 | 31 |
| 10 | 8 | 32 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 8 | 33 |
| 18 | 6 | 16 |
| 19 | 6 | 17 |
| 20 | 6 | 18 |

TABLE 2-continued

| MCS Index ($I_{MCS}$) | Modulation Order ($Q_m$) | TBS Index ($I_{TBS}$) |
|---|---|---|
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | reserved |
| 31 | 6 | reserved |

In one embodiment, the default table and the secondary table each include a CQI table. The CQI table may include a table used to indicate a modulation preferred by the UE 112 and a coding rate preferred by the UE 112 based on a CQI index. One example of a CQI table includes Table 7.2.3-1 defined in 3GPP TS 36.213, which is reproduced in Table 3 below.

TABLE 3

| CQI Index | Modulation | Code Rate x 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9144 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Any of the examples or principles discussed above in relation to the $I_{MCS}$ table may be used in relation to the CQI table for channel state information reporting. For example, a UE 112 supporting 256-QAM may be configured with two CQI mapping tables, where some of the entries in two tables are different and at least one table should include CQI values corresponding to the 256-QAM modulation order. The total number of entries in each of the configured tables may not exceed 16 to accommodate the maximum length of 4-bit CQI report. For a given CQI report only one CQI table is used. In one embodiment, a plurality of secondary CQI tables are specified or maintained. Similar to an embodiment with multiple $I_{MCS}$ tables, an RRC message may indicate which table out of the multiple secondary CQI tables is used as the secondary table. Furthermore, one secondary CQI table can be specified as the default secondary CQI table. The default secondary CQI table may be used unless RRC signaling changes the secondary table to be a different secondary CQI table. One embodiment of a secondary CQI table is shown below in Table 4.

TABLE 4

| CQI Index | Modulation | Code Rate x 1024 | Efficiency |
|---|---|---|---|
| 0 | | out of range | |
| 1 | QPSK | 78 | 0.1523 |
| 2 | 256QAM | 803 | 6.2734 |
| 3 | QPSK | 193 | 0.3770 |
| 4 | 256QAM | 889 | 6.9453 |
| 5 | QPSK | 449 | 0.8770 |
| 6 | 256QAM | 952 | 7.4375 |
| 7 | 16QAM | 378 | 1.4766 |
| 8 | 16QAM | 490 | 1.9144 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In one embodiment, the table component 202 maintains default and secondary tables for both $I_{MCS}$ tables and for CQI tables. For example, the table component 202 may store a secondary $I_{MCS}$ table which may be selectively used in place of a default $I_{MCS}$ table and may also store a secondary CQI table which may be used in place of a default CQI table.

The table component 202 may store tables that include predefined tables. For example, the default table and secondary table may be defined within a corresponding standard, such as a release of LTE. The table component 202 may store the tables such that a service cell and UE 112 know which tables are available and can use minimal signaling to configure which table is needed for use. In one embodiment, the table component 202 maintains the tables by receiving messaging to configure one or more of the default table and the secondary table. For example, the UE 112, or table component 202, may receive a table configuration message from a base station, such as a small cell, defining at least a portion of the secondary table or the default table. The configuration message may indicate a higher modulation scheme for at least one entry which may allow the UE 112 to communicate using the higher order modulation. In one embodiment, the configuration message indicates one or more entries to be changed in the secondary table over the default table. For example, the secondary table may be the same as the default table except that some entries in the secondary table are different from corresponding entries in the default table. The table component 202 may maintain the tables by modifying any tables based on the table configuration message.

In one embodiment, two $I_{MCS}$ tables are hard coded in the specification, where the first table is the same as Table 7.1.7.1-1 of TS 36.213 with QPSK, 16-QAM, and 64-QAM modulation entries and the second table has one or more entries corresponding to QPSK modulation (or other modulations) in the first table removed with 256-QAM modulation entries in their place. In another embodiment, two $I_{MCS}$ tables are configured by RRC signaling (e.g., by using a bitmap), where the entries for each table is explicitly configured (e.g., each element in a bitmap indicates the activated MCS and TBS for a given entry of a table). In another embodiment, two $I_{MCS}$ tables are hard coded in the specification and an eNB 102 can reconfigure at least one of the first and the second $I_{MCS}$ tables through medium access control (MAC) or RRC signaling, if needed.

Similarly, two CQI tables may also be hard coded in the specification, where the first table is the same as Table 7.1.7.1-1 of TS 36.213 with QPSK, 16-QAM, and 64-QAM modulation entries and the second table has one or more entries corresponding to QPSK modulation (or other modulations) in the first table removed with 256-QAM modulation entries in their place. In another embodiment, two CQI tables are configured by RRC signaling (e.g., by using a bitmap), where the entries for each table is explicitly configured (e.g., each element in bitmap indicates the activated MCS and TBS for a given table). In another embodiment, two CQI tables are hard coded in the specification and an eNB 102 can reconfigure at least one of the first and the second CQI tables through MAC/RRC signaling, if needed.

The table selection component 204 is configured to select which of the default table and the secondary table to use for a specific communication. For example, the table selection component 204 is configured to determine a selected table from the default table and the secondary table. In one embodiment, the table selection component 204 selects one of a default $I_{MCS}$ table and a secondary $I_{MCS}$ table and the table selection component 204 also selects one of a default CQI table and a secondary CQI table.

In one embodiment, the table selection component 204 is configured to select a selected table in response to the UE 112 receiving downlink control information (DCI) in a physical downlink control channel (PDCCH) or in enhanced physical downlink control channel (EPDCCH) communication. For example, the table selection component 204 may select one of the default table and the secondary table based on one or more of a number of scheduled layers, a radio network temporary identifier (RNTI) used for scrambling a cyclic redundancy check (CRC), or an extra bit in the DCI for indicating which table to use. As a specific, non-limiting example, the downlink control information indicates a number of scheduled layers, and the selecting the selected table includes selecting based on the number of scheduled layers.

In one embodiment, the table selection component 204 is configured to select the table based on the number of scheduled layers. For example, the table selection component 204 may determine whether the number of scheduled layers for a communication exceeds a layer threshold. If the number of scheduled layers, as indicated by the DCI, meets or exceeds the layer threshold, the table selection component 204 may select the secondary table. On the other hand, if the number of scheduled layers does not meet or exceed the layer threshold, the table selection component 204 may select the default table.

In one embodiment, DCI-based signaling is used for switching between tables, where the table is implicitly selected in accordance with the total number of scheduled layers for PDSCH indicated in DCI. For example, if a total number of layers is above (or less than) a certain threshold the secondary table with 256-QAM entries may be used for all transport blocks (or codewords). Otherwise the first MCS/TBS table without 256-QAM entries may be used for all transport blocks (or codewords). The threshold for the total number of layers can be RRC configured or correspond to the maximum number of layers that can be scheduled to a given UE (i.e., 256-QAM table is only used when the maximum number of layers is scheduled) or table without 256-QAM is not used for single layer transmission. In an example, the tables are selected per each codeword in accordance with the number of layers assigned for the transmission of a given codeword. If the total number of layers used for the codeword transmission is above (or less than) a certain threshold (e.g., RRC configured or maximum possible for the UE), the secondary table with entries corresponding to 256-QAM modulation is used; otherwise the default or legacy table without 256-QAM entries is used.

In some cases, where the transmission corresponds to a hybrid automatic repeat request (HARD) retransmission of a transport block, the tables used should be the same as in the original transmission regardless of the current total number of layers scheduled for the retransmissions. It should be noted that the present disclosure contemplates embodiments where only one of the default table and secondary table include 256-QAM entries as well as embodiments where both of the default table and secondary table include 256-QAM entries.

In one embodiment, the table selection component 204 is configured to select the table based on an RNTI used to scramble a CRC corresponding to received DCI. For example, the CRC for a PDCCH/EPDCCH corresponding to the DCI may be scrambled using an RNTI so that only UEs 112 that were meant to receive the PDCCH/EDPCCH can process the information. In one embodiment, the UE 112 can determine which RNTI was used to scramble the CRC after receiving and processing the PDCCH/EPDCCH. The table selection component 204 may then select the table based on which RNTI was used. In one embodiment, the table selection component 204 is configured to select the secondary table in response to the RNTI comprising a UE-specific RNTI (e.g., cell RNTI or C-RNTI). For example, if 256-QAM is configured, the UE shall assume 256-QAM only for PDSCH scheduled by C-RNTI. In one embodiment, if a UE 112 receives DCI scrambled with paging RNTI (P-RNTI), random access RNTI (RA-RNTI), semi-persistent scheduling RNTI (SPS-RNTI), or system information RNTI (SI-RNTI), the table selection component 204 may assume default or legacy tables are to be used, regardless of 256-QAM configuration. In one embodiment, the table selection component 204 is configured to select the secondary table when the RNTI includes a higher order modulation RNTI (HOM-RNTI). For example, the DCI CRC may be scrambled by a new RNTI (e.g., a higher order modulation RNTI [HMO-RNTI]). If the HMO-RNTI is not used, a default/legacy table without 256-QAM entries may be used.

In one embodiment, the DCI includes an extra bit specifically designated for table selection. For example, in addition to a 5-bit $I_{MCS}$ value the DCI may include an additional X-bit (e.g., 1-bit) value for selecting which of the default table and the secondary table to use. If the additional X-bit is included in DCI content for UE-specific search space (USS) only, it can provide for the handling of reconfiguration. For example, common search space (CSS) for DCI is used for handling reconfiguration while USS for DCI is used for selecting one of legacy and evolved ones. In this case, the X-bit value in CSS would refer to the default or legacy table. The 1-bit indicator (e.g., when X=1) in DCI for USS may represent which table is used. For example, a bit value of 0 indicates to use the default table while a bit value of 1 indicates to use the evolved or secondary table (or vice versa). One advantage of including an extra bit in DCI allows a UE to utilize full degree of freedom to support 256-QAM by fully utilizing existing MCS bits (e.g., 5-bit) in USS.

In one embodiment, a UE 112 supporting 256-QAM or a UE 112 configured with 256-QAM by higher-layer signaling have a default table that does not support 256-QAM and a secondary table that does support 256-QAM. The secondary table may include a number of entries that is greater than the number of entries for a legacy or default table. For example, the default table may include a number of entries that only requires use of a 4-bit value to select any entry while the secondary table may include a number of entries that requires more than a 4-bit value. In one embodiment, only the default table (e.g., with 4-bit value in DCI) can be used for scheduling via CSS, while the secondary table (i.e., evolved/enhanced table with X-bit value in DCI, e.g., X=4 or X=5) can be used only for the scheduling via USS. One advantage of this embodiment is that a UE 112 or eNB 102 can utilize full degree of freedom to support 256-QAM by not having any restriction on the number of bits for an $I_{MCS}$ or a CQI table for supporting 256-QAM.

In one embodiment, the table selection component 204 is configured to select the selected table in response to the UE 112 receiving one or more of an RRC layer message and a MAC layer message indicating the selected table. For example, the higher layer message may include an explicit indication regarding which of a default table or a secondary table should be used for PDSCH communications. In one embodiment, the RRC layer message may include a value that indicates which table is to be used.

The table selection component 204 may use any of the above methods for $I_{MCS}$ table selection or CQI table selection. Alternatively, or in addition, the table selection component 204 may select a CQI table based on a rank indicator (RI). For example, the UE 112 may determine an RI based on current channel quality for reporting to a serving cell. The UE 112 (and/or eNB 112) may determine which table to use based on whether the RI is above (or less than) a certain RI threshold (e.g., RRC configured or maximum possible reported RI). For example, if the RI meets the threshold, a table that has modulation entries corresponding to 256-QAM should be used. Similarly, if the RI does not meet the threshold, a default or legacy table should be used by the UE 112 for CQI reporting. In one embodiment, a default or legacy CQI table is only used if RI=1. In one embodiment, the RI threshold is configured via RRC or MAC layer signaling.

In one embodiment, after a handoff of a UE 112 (i.e., a change of the UE's 112 serving cell from the current serving cell to another cell), the default or legacy CQI table is used unless RRC/MAC signaling indicates that the second table is used after the handoff.

The communication component 206 is configured to communicate information between the UE 112 and a serving cell. In one embodiment, the UE 112 is configured to receive PDCCH/EPDCCH and PDSCH communications from an eNB 102 and process and interpret the information for the UE 112. In one embodiment, the communication component 206 receives and processes a PDSCH based on an MCS of a selected table. For example, the communication component 206 may receive an $I_{MCS}$ value indicating a specific entry in a table to be used to process a PDSCH component. The communication component 206 may reference the specific entry in the table selected by the table selection component 204 to determine the MCS for the specific PDSCH. The UE 112 may then decode the PDSCH and use or forward the information as needed.

The soft buffer 208 may include memory for storage of received encoded bits. In one embodiment, the soft buffer 208 includes a size that is sufficient to handle at least 256-QAM peak data rates. For example, LTE uses incremental redundancy HARQ. For example, a UE 112 usually stores received coded bits in the soft buffer 208. During retransmission, the UE combines the newly received bits with the previously received and stored bits to improve reliability in the accuracy of the received encoded data. Generally, the soft buffer size depends on the peak data rate in that a greater peak data rate generally needs a soft buffer size that is bigger than when a peak data rate is smaller. Thus, with introduction of 256-QAM the peak data rate will be increased and the soft buffer size may also need to be increased. Thus, the UE 112 may have a soft buffer 208 having a greater size than other legacy UEs 112 (e.g., UEs from previous releases of LTE). Thus, in one embodiment, the soft buffer 208 includes a size that is sufficient to handle at least 256-QAM peak data rates.

The soft buffer size component 210 is configured to determine an amount of the soft buffer 208 that should be used for a specific communication. For example, some of the UEs 112, eNBs 102, or small cells may correspond to a previous release such as release 8, 10, etc. of LTE. Furthermore, if there is a mismatch between the soft buffer size at the eNB 102, where encoded bits are stored in preparation for transmission, the UE 112 will not be able to properly decode a packet. Because a UE 112 is currently not able to determine a release of the serving cell, the UE 112 may not know what size of soft buffer is used to prepare and transmit the bits. In order to ensure that there is no mismatch, the soft buffer size component 210 may determine a size of a soft buffer that should be used for data reception and HARQ. In one embodiment, the soft buffer size component 210 may, at times, utilize a portion of the soft buffer 208 that corresponds to a legacy soft buffer size (e.g., a soft buffer size of a previous 3GPP release) for backwards compatibility.

In one embodiment, the soft buffer size component 210 is configured to use a default soft buffer size until an indication from the eNB 102 (or other serving cell) indicates a capability corresponding to an increased soft buffer size. For example, the soft buffer 208 may have a maximum soft buffer size and the soft buffer size component 210 may use a default soft buffer size that is less than the maximum soft buffer size. In one embodiment, if the serving cell configures 256-QAM communication, both the serving cell and the UE 112 begins using the maximum soft buffer size. In one embodiment, the soft buffer size component 210 determines that an increased soft buffer size can be used in response to the eNB 102 indicating that it is configured for a 3GPP release that supports the increased soft buffer size. This indication may be a direct or an indirect indication of release or soft buffer size. For example, if the eNB 102 configures a table that includes a 256-QAM entry as the selected table, the UE 112 and eNB 102 may then begin using the increased soft buffer size. Another example indication that the eNB 102 is capable of an increased soft buffer size may include the configuration of a secondary table by RRC, an $I_{MCS}$ value that indicates a 256-QAM modulation scheme, or the like. In other words although UE 112 has a larger soft buffer size to store the bits, it should use a smaller soft buffer corresponding to previous UE categories unless 256-QAM is configured, or a serving cell otherwise indicates it is capable of an increased soft buffer size. In one embodiment, using a larger soft buffer size, if supported both by the UE 112 and eNB 102, can provide increased performance even if lower order modulations are used.

To support 256-QAM a larger soft buffer size needs to be supported by the UE 112 to accommodate increased peak data rate when MCSs with 256-QAM are used (or enabled). Currently the supported soft buffer size at the UE 112 is provided by Rel-8 and Rel-10 ueCategory messages (ue-Category and ue-Category-v1020) using RRC signaling as defined in 3GPP TS 36.306 and 3GPP TS 36.331. According to one embodiment, additional UE 112 categories with increased total number of soft channel bits will be defined for 256-QAM capable UEs 112. Then a 256-QAM capable UE 112 is required to report a new UE category (ue-Category-v12x) on top of Rel-8/10 UE category to support backward compatibility with eNB of the previous releases (Rel-8/9/10/11). According to one embodiment, the UE 112 uses the total number of soft channel bits of legacy (Rel 8/10) UE categories by default, unless special signaling indicating support of 256-QAM tables is provided by the serving eNB 102. According to one example embodiment, 3GPP TS 36.212 of the 3GPP specification may be revised to read as follows:

If UE signals ue-Category-v12x, and is configured with 256QAM MCS/TBS table for the DL cell, $N_{soft}$ is the total number of soft channel bits [TS.36.306] according to the UE category indicated by ue-Category-v12x. If the UE signals ue-Category-v1020, and is configured with transmission mode 9 or transmission mode 10 for the DL cell, Nsoft is the total number of soft channel bits [TS.36.306] according to the UE category indicated by ue-Category-v1020 [TS.36.331]. Otherwise, Nsoft is the total number of soft channel bits [TS.36.306] according to the UE category indicated by ue-Category [TS.36.331].

If Nsoft=35982720,
  KC=5,
elseif Nsoft=3654144 and the UE is capable of supporting no more than a maximum of two spatial layers for the DL cell,
  KC=2
else
  KC=1
End if.

KMIMO is equal to 2 if the UE is configured to receive PDSCH transmissions based on transmission modes 3, 4, 8, 9 or 10 as defined in section 7.1 of [3], and is equal to 1 otherwise.

According to one example embodiment, 3GPP TS 36.213 of the 3GPP specification may be revised to read as follows:

Both for FDD and TDD, if the UE is configured with more than one serving cell, then for each serving cell, for at least $K_{MIMO} \cdot \min(M_{LH\_ARQ}, M_{limit})$ transport blocks, upon decoding failure of a code block of a transport block, the UE shall store received soft channel bits corresponding to a range of at least $w_k \ w_{k+1}, \ldots, w_{mod(k+n_{SB}-1, N_{cb})}$, where:

$$n_{SB} = \min\left(N_{cb}, \left\lfloor \frac{N'_{soft}}{C \cdot N_{cells}^{DL} \cdot K_{MIMO} \cdot \min(M_{DL\_HARQ}, M_{limit})} \right\rfloor\right),$$

$w_k$, C, $N_{cb}$, $K_{MIMO}$, and $M_{limit}$ are defined in clause 5.1.4.1.2 of [4].

MDL_HARQ is the maximum number of DL HARQ processes.

$N_{cells}^{DL}$ is the number of configured serving cells.

If the UE signals ue-Category-v12x, $N'_{soft}$ is the total number of soft channel bits [36.306] according to the UE category indicated by ue-Category-v12x [36.306]. If the UE signals ue-Category-v1020, $N'_{soft}$ is the total number of soft channel bits [36.306] according to the UE category indicated by ue-Category-v1020 [36.331]. Otherwise, $N'_{soft}$ is the total number of soft channel bits [36.306] according to the UE category indicated by ue-Category [36.331].

In determining k, the UE should give priority to storing soft channel bits corresponding to lower values of k. $w_k$ shall correspond to a received soft channel bit. The range $w_k \ w_{k+1}, \ldots, w_{mod(k+n_{SB}-1, N_{cb})}$ may include subsets not containing received soft channel bits.

Figure 3:
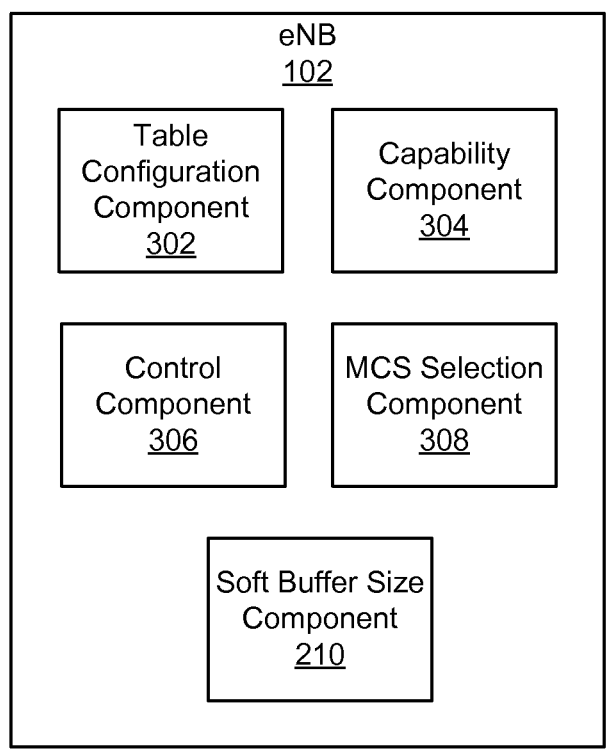
FIG. 3 is a schematic block diagram of example components of a base station.

FIG. 3 is a schematic block diagram of an eNB 102. The eNB 102 includes a network table configuration component 302, a capability component 304, a control component 306, an MCS selection component 308, and a soft buffer size component 210. The components 302-308 and 210 are given by way of example only and may not all be included in all embodiments. Some embodiments may include any one or any combination of two or more of the components 302-308 and 210. In one embodiment, the components 302-308 and 210 may be included within any serving cell, such as an RNC for a small cell.

The table configuration component 302 is configured to maintain and/or configure a plurality of tables for selection and indication of modulation schemes, coding rates, transport block size, or the like. Specifically, the table configuration component 302 may store, configure, or maintain any of the variations on the default and secondary tables discussed above in relation to the table selection component 204 of the UE 112. For example, the table configuration component 302 may store one or more of Table 1, Table 2, Table 3, or Table 4, above. In one embodiment, the table configuration component 302 is configured to configure a secondary table. For example, the table configuration component 302 may generate and send a table configuration message as discussed above to configure one or more entries of a secondary table. In one embodiment, the table configuration component 302 is also configured to determine which of a default table and secondary table should be used. The table configuration component 302 may determine a current selected table based on any of the direct or indirect indications discussed above, such as based on one or more of the following: RRC messaging; an RNTI or number of layers corresponding to DCI; an RI received from a UE 112, or any of the other disclosed variations. Any of the variations discussed above in relation to the default table and secondary table, configuration of the default table and secondary table, and selection of the default table may be performed or determined by the table configuration component 302 on the network side.

The capability component 304 is configured to determine whether a specific UE 112 is capable of a high order modulation scheme (e.g., 256-QAM). For example, the eNB 102 may be located in a small cell and may be capable of higher order modulation and may be in communication with the UE 112. In one embodiment, the capability component 304 may determine that the UE 112 is capable of the high order modulation scheme based on a 3GPP release version of the UE 112. For example, if the UE 112 has a release version that is capable of 256-QAM, the eNB 102 may assume that the UE 112 is capable of 256-QAM and that the UE 112 is capable of maintaining and selecting a default table and a secondary table.

The control component 306 is configured to send control information to a UE 112 to configure a downlink communication. For example, the control component 306 may send DCI to the UE 112 in a PDCCH/EPDCCH communication. In one embodiment, the control information indicates to the UE, directly or indirectly, which of a default table and a secondary table are to be used for a corresponding PDSCH communication. For example, as discussed above in relation to the table selection component 204 of FIG. 2, the control information may include information about a number of layers, a CRC scrambled by an RNTI, or other information that the UE 112 can interpret to determine which table to use for MCS selection or CQI.

In one embodiment, the control component 306 sends control information comprising a value, such as $I_{MCS}$, indicating the MCS to receive and process the PDSCH communication. For example, the $I_{MCS}$ value may indicate which entry of a selected table should be used to decode and process the PDSCH communication. In one embodiment, the $I_{MCS}$ value is determined by the MCS selection component 308 which provides the $I_{MCS}$ value to the control component 306 for inclusion in DCI.

The MCS selection component 308 is configured to determine an MCS to be used for a specific communication. In one embodiment, the MCS selection component 308 determines the MCS based on information about a channel received from the UE 112. For example, the MCS selection component 308 may receive a CQI from the UE 112 that indicates a recommended modulation and a recommended coding rate. The MCS selection component 308 may use the recommendation from the UE 112 to determine what MCS should be used for a PDSCH. In one embodiment, the MCS selection component 308 references a selected CQI table based on the CQI value to determine the UE's 112 recommendation. The MCS selection component 308 may then select an MCS, and a corresponding $I_{MCS}$ value, for communication to the UE 112. For example, the MCS selection component 308 may select an MCS that does not exceed the CQI recommendation by the UE 112. The MCS selection component 308 may provide the $I_{MCS}$ value to the control component 306 for communication to the UE 112.

The eNB 102 may also include a soft buffer size component 210 configured to determine a size of a soft buffer to use when communicating with a specific UE 112. For example, the soft buffer size component 210 of the eNB 102 may operate in the same or a similar manner as the soft buffer size component 210 of the UE 112. For example, the soft buffer size component 210 of the eNB 102 may use a default buffer size until the eNB 102 provides information to the UE 112 that indicates that the eNB 102 has a capability of using an increased soft buffer size.

Figure 4:
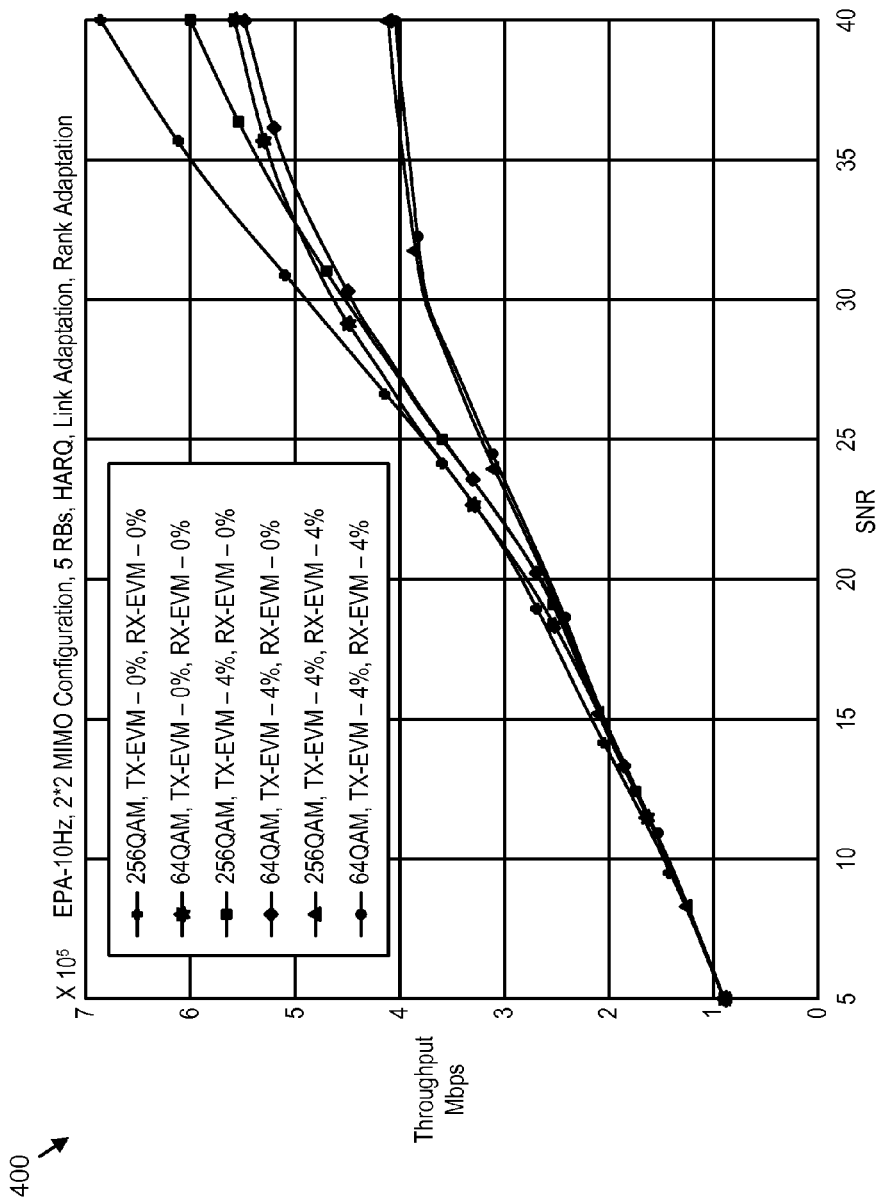
FIG. 4 is a graph illustrating logarithm of the likelihood ratio for various modulation schemes.

FIG. 4 is a graph 400 illustrating logarithm of the likelihood ratio (LLR) for various modulation schemes. Specifically, the graph 400 shows the link-level comparison of downlink LTE-A with maximum modulation order of 64-QAM and 256-QAM. It can be seen that LTE system with 256-QAM could provide some performance gains generally at high SINR, where throughput of LTE-A system is determined by the transmission from two layers. This observation motivates the selection of the tables in accordance with the number of spatial layers or RI.

FIG. 5 is a schematic flow chart diagram illustrating a method 500 for determining a CQI and CQI reporting. In one embodiment, the method 500 is performed by a UE 112 based, in part, on communications with an eNB 102 or other serving cell.

The method 500 begins and the UE 112 enables 256-QAM at the UE 112. For example, the UE 112 may include a radio, hardware, and/or software that are capable of communicating using a 256-QAM scheme. The UE 112 configures 504 two CQI mapping tables (e.g., a default table and a secondary table) at the UE 112. For example, the UE 112 may be configured with two CQI mapping tables that are defined within a communication standard or may be configured dynamically based on table configuration messages from an eNB 102. The UE 112 determines 506 an RI for a communication and selects 508 a CQI mapping table based on the RI. The UE 112 determines 510 a CQI from an entry in the selected CQI mapping table and reports the CQI to a serving cell.

FIG. 6 is a schematic flow chart diagram illustrating a method 600 for determining an MCS for receiving a downlink communication, such as PDSCH. In one embodiment, the method 600 is performed by a UE 112 based, in part, on communications with an eNB 102 or other serving cell.

The method 600 begins and the UE 112 is configured 602 for PDSCH reception using 256-QAM. For example, the UE 112 may include a radio, hardware, and/or software that are capable of communicating using a 256-QAM scheme. The UE 112 configures 604 two MCS/TBS mapping tables (e.g., a default table and a secondary table). In one embodiment, the UE 112 configures 604 the mapping tables based on messages received from a serving cell or eNB 102. The UE 112 receives 606 DCI and selects 608 one of the MCS/TBS mapping tables based on the DCI. For example, the DCI may indicate a number of layers and the UE 112 may select a table based on the number of layers. As another example, the DCI may include a CRC scrambled based on an RNTI and the UE 112 may select a table based on the RNTI. The UE 112 determines 610 an MCS to be used for a PDSCH and receives the PDSCH based on the MCS. For example, the UE 112 may determine 610 the MCS based on an $I_{MCS}$ value received from a UE in DCI.

Figures 7, 8:
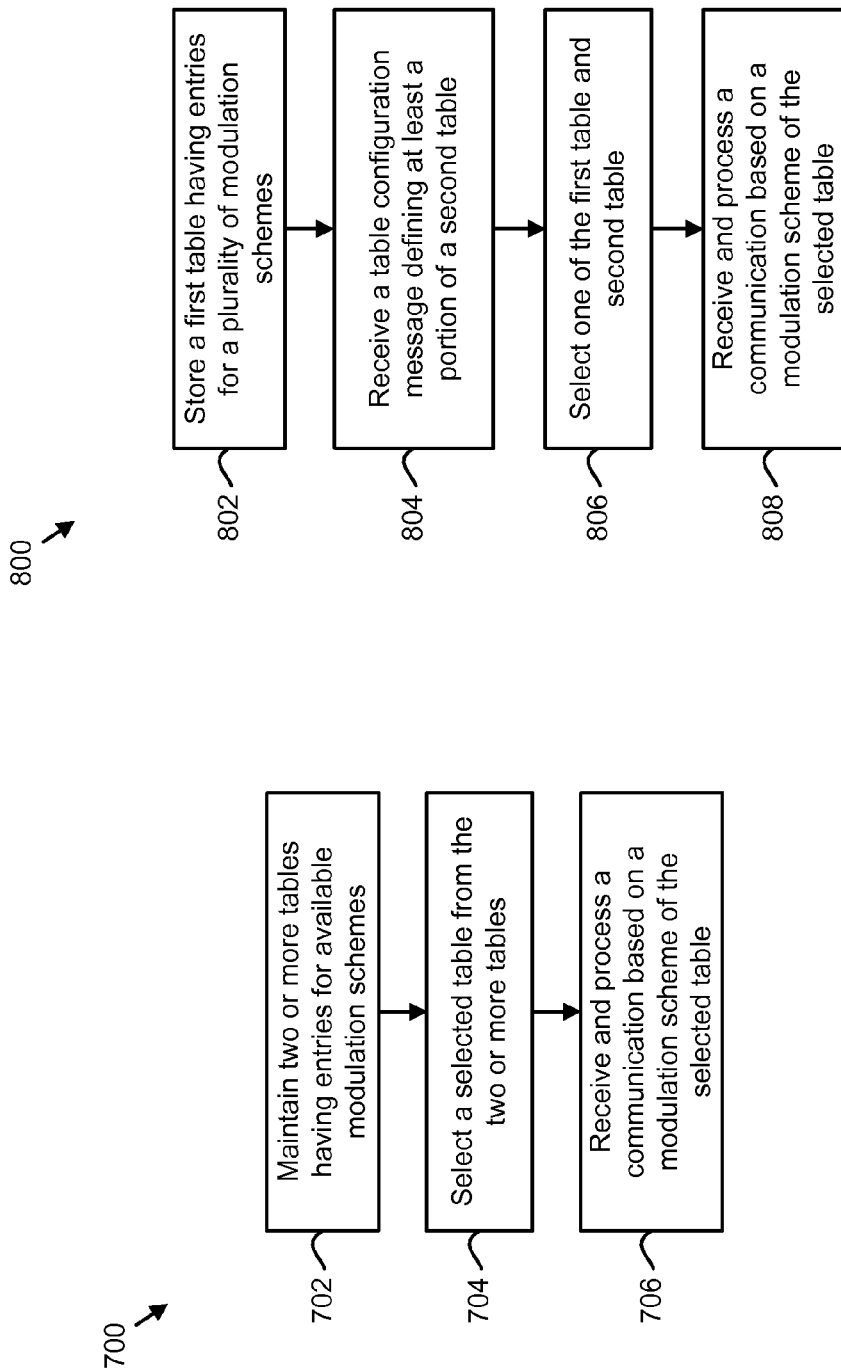
FIG. 7 is schematic flow chart diagram illustrating a method for determining a modulation and coding scheme for receiving a downlink communication.
FIG. 8 is schematic flow chart diagram illustrating a method for configuring a modulation and coding scheme.

FIG. 7 is a schematic flow chart diagram illustrating a method 700 for configuring an MCS at a UE 112. The method 700 may be performed by a UE 112 or other wireless communication device.

The method 700 begins and a table component 202 maintains two or more tables each having entries for a plurality of available modulation schemes. The two or more tables may include a default table and a secondary table. In one embodiment, the default table and the secondary table have a matching number of entries. In one embodiment, the secondary table comprises an entry corresponding to a 256-QAM scheme.

The table selection component 204 selects 704 a selected table from one of the default table and the secondary table. In one embodiment, the table selection component 204 selects 704 a table based on DCI received from a serving cell. The communication component 206 receives 706 and processes a communication from the serving cell based on an MCS of the selected table.

FIG. 8 is a schematic flow chart diagram illustrating a method 800 for configuring an MCS at a UE 112. The method 800 may be performed by a UE 112 or other wireless communication device.

The method 800 begins and a table component 202 stores 802 a first table having entries for a plurality of modulation schemes for communication between the mobile communication device and a base station. The first table may include a default table or a legacy table. The table component 202 receives 806 a table configuration message from a base station, such as a small cell. The table configuration message defines at least a portion of a second table. The second table includes an entry for a modulation scheme having a higher order modulation than any of the plurality of modulation schemes of the first table. In one embodiment, the second table includes a same number of entries as the first table and is configured for selective use in place of the first table.

A table selection component 204 selects 806 a selected table from one of the first table and the second table. In one embodiment, the table selection component 204 selects 704 a table based on DCI received from a serving cell. The communication component 206 receives 808 and processes a communication from the serving cell based on an MCS of the selected table.

Figure 9:
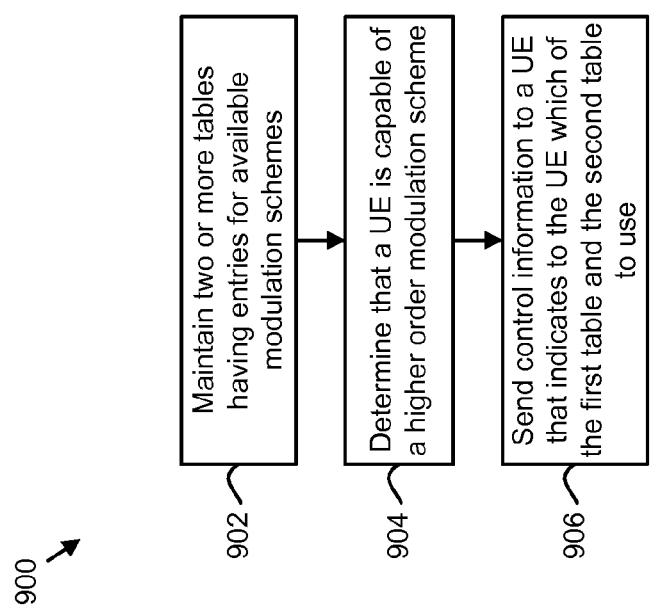
FIG. 9 is schematic flow chart diagram illustrating another method for configuring a modulation and coding scheme.

FIG. 9 is a schematic flow chart diagram illustrating a method 900 for configuring an MCS at a UE 112. The method 900 may be performed by an eNB 102 or other serving node, such as by a small cell.

The method 900 begins and a table configuration component 302 maintains 902 two or more tables each having entries for a plurality of available modulation schemes. The one or more tables may include a first table and a second table, wherein the first table and the second table include a matching number of entries and the second table includes an entry for a high order modulation scheme higher than a highest modulation scheme of the first table. In one embodiment, the table configuration component 302 maintains 902 the tables by storing the tables. In one embodiment, the table configuration component 302 maintains 902 the tables by sending a table configuration message to a UE 112 to define at least a portion of the two tables.

A capability component 304 determines 904 that a UE is capable of a high order modulation scheme. For example, the capability component 304 may determine 904 whether a specific UE 112 is capable of communication using 256-QAM. A control component 306 sends 906 control information to a UE in a PDCCH/EPDCCH communication. The control information indicates to the UE which table of the first table and the second table to use for a corresponding PDSCH communication.

Figure 10:
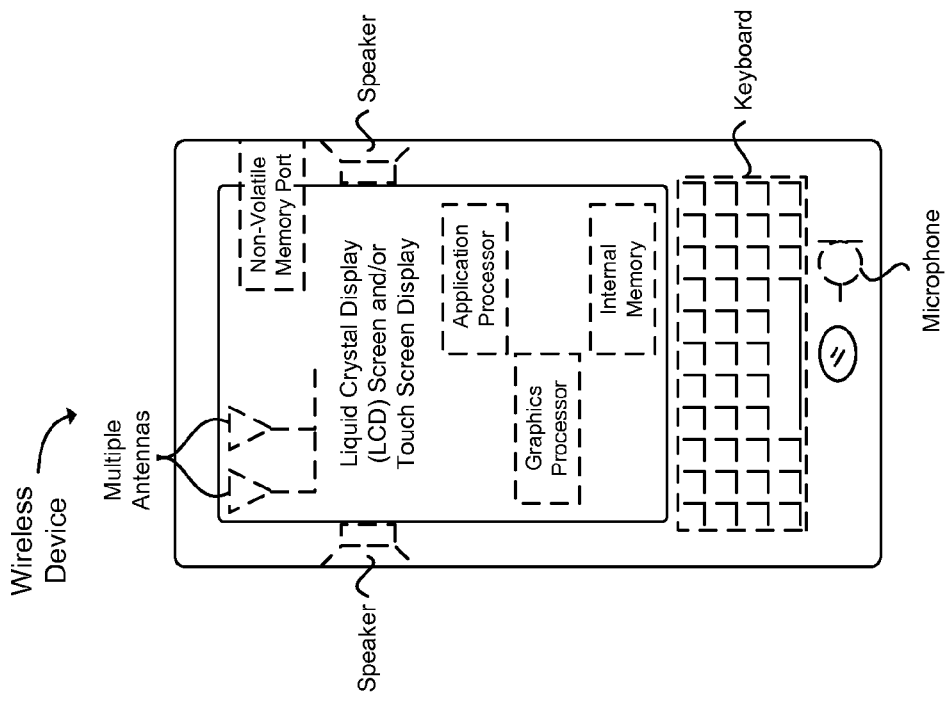
FIG. 10 illustrates a diagram of a wireless device (e.g., UE) in accordance with an example.

FIG. 10 provides an example illustration of a mobile device, such as a user equipment (UE), a mobile station (MS), a mobile wireless device, a mobile communication device, a tablet, a handset, or other type of mobile wireless device. The mobile device may include one or more antennas configured to communicate with a node, macro node, low power node (LPN), or transmission station, such as a base station (BS), an eNB, a base band unit (BBU), a remote radio head (RRH), a remote radio equipment (RRE), a relay station (RS), a radio equipment (RE), or other type of wireless wide area network (WWAN) access point. The mobile device may be configured to communicate using at least one wireless communication standard including 3GPP LTE, WiMAX, High Speed Packet Access (HSPA), Bluetooth, and WiFi. The mobile device may communicate using separate antennas for each wireless communication standard or shared antennas for multiple wireless communication standards. The mobile device may communicate in a wireless local area network (WLAN), a wireless personal area network (WPAN), and/or a WWAN.

FIG. 10 also provides an illustration of a microphone and one or more speakers that may be used for audio input and output from the mobile device. The display screen may be a liquid crystal display (LCD) screen, or other type of display screen such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

The following examples pertain to further embodiments.

Example 1 is a UE that includes a table component, a table selection component, and a communication component. The table component is configured to maintain two or more tables each having entries for a plurality of available modulation schemes. The two or more tables include a default table and a secondary table which have a matching number of entries. The secondary table includes an entry corresponding to a 256-QAM scheme. The table selection component is configured to select a selected table from one of the default table and the secondary table. The communication component is configured to receive and process a communication from an eNB based on a modulation and coding scheme of the selected table.

In Example 2, the default table and secondary table of Example 1 each include a modulation and coding scheme table used to select a modulation order and transport block size based on a modulation and coding scheme index. The secondary table is for selective use in place of the default table.

In Examples 3, the default table of Example 2 includes a first entry corresponding to a first modulation order and a second entry corresponding to a second modulation order higher than the first modulation order. The first entry and the second entry correspond to coding schemes having the same spectral efficiency and the secondary table includes the entry corresponding to the 256-QAM scheme in place of one of the first entry and the second entry.

In Example 4, the default table and secondary table of any of Examples 1-3 each include a channel quality indicator table used to indicate a modulation and coding rate preferred by the UE based on a channel quality indicator index. The secondary table is for selective use in place of the default table In Example 5, the default table of any of Examples 1-4 includes a default modulation and coding scheme table and the secondary table includes a secondary modulation and coding scheme table. The table component is further configured to maintain a default channel quality indicator table and a secondary channel quality indicator table. The table selection is optionally further configured to select a plurality of selected tables comprising one of the default modulation and coding scheme table and the secondary modulation and coding scheme table and select one of the default channel quality indicator table and the secondary channel quality indicator table.

In Example 6, the table selection component of any of Examples 1-5 is configured to select the selected table in response to the UE receiving one or more of an RRC layer message or a MAC layer message indicating the selected table.

In Example 7, the table selection component of any of Examples 1-6 is configured to select the selected table in response to the UE receiving downlink control information in a PDCCH or EPDCCH communication.

In Example 8, the UE of any of Examples 1-7 includes a soft buffer having a maximum soft buffer size. The UE further includes a soft buffer size component that is configured to use a default soft buffer size until an indication from the eNB indicates a capability corresponding to the maximum soft buffer size. The default soft buffer size is less than the maximum soft buffer size.

In Example 9, the soft buffer size component of Example 8 selects the maximum soft buffer size in response to the eNB configuring 256-QAM.

Example 10 is a mobile communication device configured to store a first table having entries for a plurality of modulation schemes for communication between the mobile communication device and a base station. The mobile communication device is further configured to receive a table configuration message from the base station, the table configuration defining at least a portion of a second table. The second table includes a modulation scheme having a modulation order higher than the plurality of modulation schemes of the first table. The second table includes a same number of entries as the first table and the second table is configured for selective use in place of the first table. The mobile communication device is further configured to select a selected table from one of the first table and the second table and to receive and process a communication from the base station based on an entry in the selected table.

In Example 11, the first table and the second table of Example 10 are predefined by a communication standard.

In Example 12, the mobile communication device of any of Examples 10-11 is further configured to determine a rank indicator based on a current channel quality and select the selected table based on the rank indicator.

In Example 13, selecting the selected table in Example 12 optionally includes selecting based on the rank indicator meeting or exceeding a rank indicator threshold configured via one or more of a RRC layer message and a MAC layer message In Example 14, the table configuration message of any of Examples 10-13 optionally indicates which entries in the first table should be removed and replaced with entries corresponding to the higher order modulation in the second table.

In Example 15, selecting the selected table in any of Examples 10-14 includes selecting based on control information received in a physical layer communication.

In Example 16, the control information of any of Examples 10-15 indicates a number of scheduled layers and selecting the selected table is based the number of scheduled layers.

In Example 17, selecting the selected table in any of Examples 10-16 includes selecting based on the number of scheduled layers meeting or exceeding a layer threshold configured via one or more of a RRC layer message and a MAC layer message.

In Example 18, the physical layer communication of any of Examples 10-17 includes a cyclic redundancy check scrambled using an RNTI and the selected table is selected based on the RNTI.

In Example 19, the RNTI of Example 18 includes a C-RNTI.

In Example 20, the mobile communication device of any of Examples 10-19 include a soft buffer having a maximum soft buffer size. The mobile communication device is further configured to use a default soft buffer size until an indication from a base station indicates a capability corresponding to the maximum soft buffer size. The default soft buffer size is less than the maximum soft buffer size.

In Example 21, the mobile communication device of any of Examples 10-20 is configured to use the maximum soft buffer size in response to the eNB configuring the modulation scheme comprising the higher order modulation. The higher order modulation includes a 256-QAM scheme.

Example 22 is an eNB that includes a table configuration component, a capability component, and a control component. The table component is configured to maintain two or more tables each including entries for a plurality of available modulation schemes. The one or more tables include a first table and a second table having a matching number of entries. The second table includes an entry for a high-order modulation scheme higher than a highest modulation scheme of the first table. The capability component is configured to determine that UE is capable of the high-order modulation scheme. The eNB is in communication with the UE via a small cell. The control component is configured to send control information to the UE in a PDCCH or EPD-CCH communication. The control information indicates to the UE which table of the first table and the second table to use for a corresponding PDSCH communication.

In Example 23, the capability component of Example 22 is configured to determine that the UE is capable of the high-order modulation scheme based on a 3GPP release version of the UE.

In Example 24, the eNB of any of Examples 22-23 further includes a modulation and coding scheme selection component that is configured to receive a channel quality indicator from the UE indicating a recommended modulation and a recommended coding rate and determine a modulation and coding scheme for the UE based on the channel quality indicator.

In Example 25, the control component of any of Examples 22-24 is further configured to send control information comprising a modulation and coding scheme index indicating the modulation and coding scheme to receive and process the PDSCH communication.

Example 26 is a method for determining an MCS. The method includes maintaining two or more tables each having entries for a plurality of available modulation schemes. The two or more tables include a default table and a secondary table which have a matching number of entries. The secondary table includes an entry corresponding to a 256-QAM scheme. The method includes selecting a selected table from one of the default table and the secondary table. The method includes receiving and processing a communication from an eNB based on a modulation and coding scheme of the selected table.

In Example 27, the default table and secondary table of Example 26 each include a modulation and coding scheme table used to select a modulation order and transport block size based on a modulation and coding scheme index. The secondary table is for selective use in place of the default table.

In Examples 28, the default table of Example 27 includes a first entry corresponding to a first modulation order and a second entry corresponding to a second modulation order higher than the first modulation order. The first entry and the second entry correspond to coding schemes having the same spectral efficiency and the secondary table includes the entry corresponding to the 256-QAM scheme in place of one of the first entry and the second entry.

In Example 29, the default table and secondary table of any of Examples 26-28 each include a channel quality indicator table used to indicate a modulation and coding rate preferred by the UE based on a channel quality indicator index. The secondary table is for selective use in place of the default table In Example 30, the default table of any of Examples 26-29 includes a default modulation and coding scheme table and the secondary table includes a secondary modulation and coding scheme table. The method further includes maintaining a default channel quality indicator table and a secondary channel quality indicator table. The method includes selecting a plurality of selected tables comprising one of the default modulation and coding scheme table and the secondary modulation and coding scheme table and selecting one of the default channel quality indicator table and the secondary channel quality indicator table.

In Example 31, the method of any of Examples 26-30 include selecting the selected table in response to the UE receiving one or more of an RRC layer message or a MAC layer message indicating the selected table.

In Example 32, selecting the selected table in any of Examples 26-31 includes selecting in response to the UE receiving downlink control information in a PDCCH or EPDCCH communication.

In Example 33, the UE of any of Examples 26-32 includes a soft buffer having a maximum soft buffer size. The method further includes using a default soft buffer size until an indication from the eNB indicates a capability corresponding to the maximum soft buffer size. The default soft buffer size is less than the maximum soft buffer size.

In Example 34, the method of Example 33 further includes selecting the maximum soft buffer size in response to the eNB configuring 256-QAM.

Example 35 is a method for determining an MCS including storing a first table having entries for a plurality of modulation schemes for communication between a mobile communication device and a base station. The method further includes receiving a table configuration message from the base station, the table configuration defining at least a portion of a second table. The second table includes a modulation scheme having a modulation order higher than the plurality of modulation schemes of the first table. The second table includes a same number of entries as the first table and the second table is configured for selective use in place of the first table. The method includes selecting a selected table from one of the first table and the second table and receiving and processing a communication from the base station based on an entry in the selected table.

In Example 36, the first table and the second table of Example 35 are predefined by a communication standard.

In Example 37, the method of any of Examples 35-36 further include determining a rank indicator based on a current channel quality and selecting the selected table based on the rank indicator.

In Example 38, selecting the selected table in Example 37 optionally includes selecting based on the rank indicator meeting or exceeding a rank indicator threshold configured via one or more of a RRC layer message and a MAC layer message In Example 39, the table configuration message of any of Examples 35-38 optionally indicates which entries in the first table should be removed and replaced with entries corresponding to the higher order modulation in the second table.

In Example 40, selecting the selected table in any of Examples 35-39 includes selecting based on control information received in a physical layer communication.

In Example 41, the control information of any of Examples 35-40 indicates a number of scheduled layers and selecting the selected table is based the number of scheduled layers.

In Example 42, selecting the selected table in any of Examples 35-41 includes selecting based on the number of scheduled layers meeting or exceeding a layer threshold configured via one or more of a RRC layer message and a MAC layer message.

In Example 43, the physical layer communication of any of Examples 35-42 includes a cyclic redundancy check scrambled using an RNTI and the selected table is selected based on the RNTI.

In Example 44, the RNTI of Example 43 includes a C-RNTI.

In Example 45, the mobile communication device of any of Examples 35-44 includes a soft buffer having a maximum soft buffer size. The method further includes using a default soft buffer size until an indication from a base station indicates a capability corresponding to the maximum soft buffer size. The default soft buffer size is less than the maximum soft buffer size.

In Example 46, the method of any of Examples 35-45 includes using the maximum soft buffer size in response to the eNB configuring the modulation scheme comprising the higher order modulation. The higher order modulation includes a 256-QAM scheme.

Example 47 is a method for determining an MCS that includes maintaining two or more tables each including entries for a plurality of available modulation schemes. The one or more tables include a first table and a second table having a matching number of entries. The second table includes an entry for a high-order modulation scheme higher than a highest modulation scheme of the first table. The method includes determining that UE is capable of the high-order modulation scheme. An eNB is in communication with the UE via a small cell. The method includes sending control information to the UE in a PDCCH or EPDCCH communication. The control information indicates to the UE which table of the first table and the second table to use for a corresponding PDSCH communication.

In Example 48, determining that the UE is capable of the high-order modulation scheme in Example 47 includes determining based on a 3GPP release version of the UE.

In Example 49, the method of any of Examples 47-48 further includes receiving a channel quality indicator from the UE indicating a recommended modulation and a recommended coding rate and determining a modulation and coding scheme for the UE based on the channel quality indicator.

In Example 50, the method of any of Examples 47-49 further includes sending control information that includes a modulation and coding scheme index indicating the modulation and coding scheme to receive and process the PDSCH communication.

Example 51 is an apparatus that includes means to perform a method of any of Examples 26-50.

Example 52 is a machine readable storage including machine-readable instructions which, when executed, implement a method or realize an apparatus of any of Examples as 26-51.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present disclosure should, therefore, be determined only by the following claims.

The invention claimed is:

1. A mobile communication device configured to:
store, in a data storage of the mobile communication device, data corresponding to a first table having entries for a plurality of modulation schemes for communication between the mobile communication device and a base station;
store, in the data storage, data corresponding to a second table having entries for a modulation scheme including at least one entry of a modulation order that is higher than a modulation order of each of the plurality of modulation schemes of the first table, wherein the second table comprises a same number of entries as the first table, and wherein the second table is configured for selective use in place of the first table;
select a selected table from one of the first table and the second table based, at least in part, on a parameter of a layer higher than a physical layer, a radio network temporary identifier (RNTI) used for scrambling a cyclic redundancy check (CRC), and an implicit feature of a downlink control information (DCI) message; and
receive and process a communication from the base station based on an entry in the selected table.

2. The mobile communication device of claim 1, wherein the first table and the second table are predefined by a communication standard.

3. The mobile communication device of claim 1, wherein the mobile communication device is further configured to determine a rank indicator based on a current channel quality, and wherein selecting the selected table comprises selecting based, at least in part, on the rank indicator.

4. The mobile communication device of claim 3, wherein selecting the selected table comprises selecting based, at least in part, on the rank indicator meeting or exceeding a rank indicator threshold configured via one or more of a radio resource configuration (RRC) layer message and a medium access control (MAC) layer message.

5. The mobile communication device of claim 1, wherein selecting the selected table comprises selecting based, at least in part, on control information received in a physical layer communication.

6. The mobile communication device of claim 5, wherein the control information indicates a number of scheduled layers and wherein selecting the selected table comprises selecting based, at least in part, on the number of scheduled layers.

7. The mobile communication device of claim 6, wherein selecting the selected table comprises selecting based, at least in part, on the number of scheduled layers meeting or exceeding a layer threshold configured via one or more of a radio resource control (RRC) layer message and a medium access control (MAC) layer message.

8. The mobile communication device of claim 1, wherein selecting the selected table comprises selecting the second table only if the RNTI used for scrambling the CRC is a cell RNTI (C-RNTI).

9. The mobile communication device of claim 1, wherein the mobile communication device comprises a soft buffer comprising a maximum soft buffer size, wherein the mobile communication device is further configured to use a default soft buffer size until an indication from a base station indicates a capability corresponding to the maximum soft buffer size, wherein the default soft buffer size is less than the maximum soft buffer size.

\* \* \* \* \*